(12) United States Patent
Wiedemann

(10) Patent No.: US 7,842,233 B2
(45) Date of Patent: Nov. 30, 2010

(54) APPARATUS AND METHODS FOR DISINFECTING COMPONENTS OF AN AIR CONDITIONING SYSTEM IN A MOTOR VEHICLE

(75) Inventor: Stefan Wiedemann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1031 days.

(21) Appl. No.: 11/603,106

(22) Filed: Nov. 22, 2006

(65) Prior Publication Data

US 2007/0065347 A1 Mar. 22, 2007

Related U.S. Application Data

(63) Continuation of application No. PCT/EP2005/005514, filed on May 20, 2005.

(30) Foreign Application Priority Data

May 25, 2004 (DE) ................ 10 2004 025 462

(51) Int. Cl.
*A61L 2/02* (2006.01)
(52) U.S. Cl. .................. 422/22; 422/186.05; 62/78
(58) Field of Classification Search ................ None
See application file for complete search history.

(56) References Cited

U.S. PATENT DOCUMENTS

| 6,751,968 | B2 | 6/2004 | Takano |
| 2004/0241005 | A1 | 12/2004 | Hersel et al. |
| 2008/0193882 | A1 | 8/2008 | Endo et al. |

FOREIGN PATENT DOCUMENTS

| DE | 196 51 403 A1 | 6/1998 |
| DE | 102 09 837 A1 | 9/2003 |
| DE | 103 01 214 B3 | 4/2004 |
| JP | 2000-071758 (A) | 3/2000 |
| JP | 2002-253662 A | 9/2002 |
| JP | 2003-160231 (A) | 6/2003 |
| JP | 2003-194386 (A) | 7/2003 |
| JP | 2004-017684 (A) | 1/2004 |
| JP | 2008-258562 (A) | 10/2008 |
| JP | 2009-086156 (A) | 4/2009 |

OTHER PUBLICATIONS

Japanese Office Action dated Jul. 29, 2010 (Five (5) Pages).

*Primary Examiner*—Elizabeth L McKane
(74) *Attorney, Agent, or Firm*—Crowell & Moring LLP

(57) ABSTRACT

A device for disinfecting components of an air conditioning system in a motor vehicle is provided. The device includes an ionizer arranged in the air conditioning system and an electronic control unit configured to activate the ionizer to produce an amount of ions. The amount of ions is determined as a function of an amount of condensate on the components of the air conditioning system to be disinfected.

18 Claims, 1 Drawing Sheet

APPARATUS AND METHODS FOR DISINFECTING COMPONENTS OF AN AIR CONDITIONING SYSTEM IN A MOTOR VEHICLE

This application is a continuation of PCT International Application No. PCT/EP2005/005514, filed May 20, 2005, which claims priority under 35 U.S.C. §119 to German Patent Application No. 10 2004 025 462.1 filed May 25, 2004, the entire disclosures of which are herein expressly incorporated by reference.

BACKGROUND AND SUMMARY OF THE INVENTION

The present invention relates generally to motor vehicles and, more particularly, to a device for disinfecting components of an air conditioning system, including an evaporator.

A known device for cleaning breathing air in a motor vehicle is disclosed in connection with the system described in the DE 196 51 403 A1. This system focuses predominantly on cleaning the breathing air in the passenger compartment while the motor vehicle is running.

A problem with the aforementioned device is metering the correct amount of ions. If the amount of ions is too small, the effect of the device is inadequate. If the amount of ions is too large, it may have a disturbing effect on the passengers. Such conventional devices are thus deficient in their ability to assure, on the one hand, reliable disinfection and, on the other hand, not to impair the well-being of the passengers.

Systems, apparatus, and methods consistent with the present invention may obviate one or more of the above and/or other issues.

Consistent with the present invention, a device for disinfecting components of an air conditioning system in a motor vehicle may be provided. The device may comprise: an ionizer arranged in the air conditioning system; and an electronic control unit configured to activate the ionizer to produce an amount of ions, wherein the amount of ions is determined as a function of an amount of condensate on the components of the air conditioning system to be disinfected.

Consistent with the present invention, a method for disinfecting components of an air conditioning system in a motor vehicle may be provided. The method may comprise: determining an amount of ions for disinfecting at least one component of the air conditioning system, based on an amount of condensate on the at least one component; and inducing a production of the determined amount of ions so as to disinfect the at least one component.

Other objects, advantages and novel features of the present invention will become apparent from the following detailed description of the invention when considered in conjunction with the accompanying drawings.

DETAILED DESCRIPTION OF THE DRAWINGS

Figure 1:
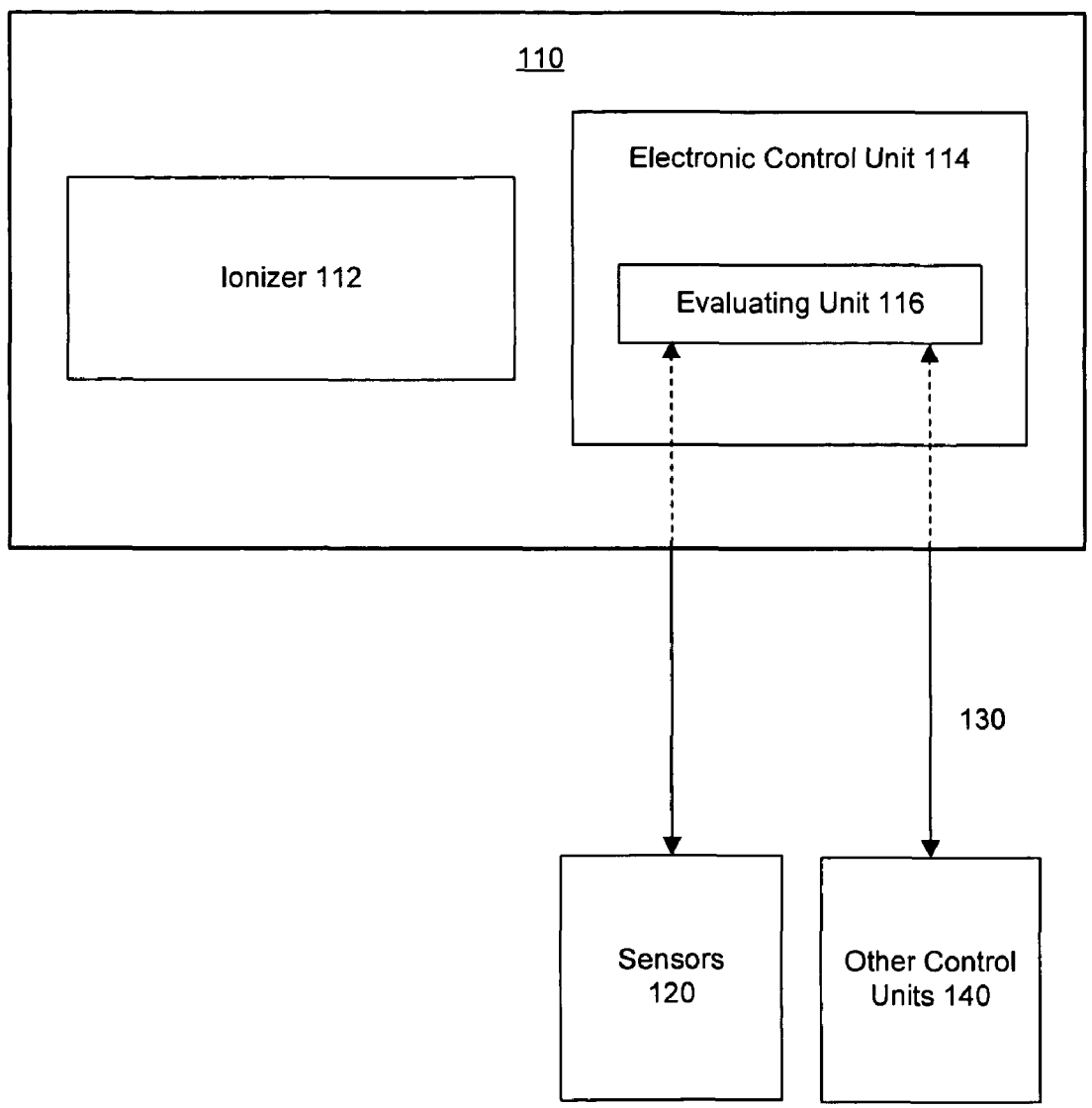
FIG. 1 is a functional block diagram illustrating an exemplary apparatus for disinfecting components of a vehicle air conditioning system, consistent with the present invention.

The following description refers to the accompanying drawing. The implementations set forth in the following description do not represent all implementations consistent with the claimed invention. Instead, they are merely some examples of implementations consistent with the invention. Other implementations may be used and structural and procedural changes may be made without departing from the scope of present invention.

FIG. 1 is a functional block diagram depicting an exemplary apparatus 110 for disinfecting components, such as an evaporator (not shown), of an air conditioning system of a vehicle, consistent with the present invention. The illustrated elements and their configurations are exemplary only. Other variations in the number and arrangement of components are possible, consistent with the present invention. Further, depending on the implementation, certain illustrated elements may be absent and/or additional components not illustrated may be present. In addition, some or all of the functionality of the illustrated components may overlap and/or exist in a fewer or greater number of components than what is illustrated.

As illustrated in FIG. 1, apparatus 110 may include an ionizer 112, which may be arranged in a vehicle air conditioning system (not shown). Ionizer 112 may be actuated by an electronic control unit 114. Electronic control unit 114 may be configured in such a manner that ionizer 112 may be switched on or activated to produce a pre-determined amount of ions (desired value of the amount of ions).

The amount of ions may be pre-determined as a function of an amount of condensate on the components to be disinfected. Preferably, not only the absolute ion mass, but also an ion mass per unit of time may be defined as the desired value of the amount of ions, since in order to protect the passengers, a maximum allowable absolute ion mass may not be, if desired, exceeded. Then the efficiency of the disinfection depends on the duration of time, in which the (limited) ion mass is produced. Therefore, the term pre-determined amount of ions may be defined as either the absolute ion mass or a specific ion mass, which must be produced for a certain period of time.

Ionizer 112 may be arranged as close as possible to an evaporator (not shown) in the air conditioning system. In one implementation, electronic control unit 114 may be integrated, for example, in ionizer 112 or also in the air conditioner control unit, which exists in any event.

To cut the cost of expensive humidity sensors, the amount of condensate is assessed preferably in control unit 114 by means of information provided to said control unit. Electronic control unit 114 may receive the necessary information as an input variable, for example, by means of corresponding sensors 120 or by means of databus connections 130 to other electronic control units 140.

The input variables may be processed in a corresponding evaluating unit 116 in control unit 114. The result of this processing is a corresponding actuation of ionizer 112. To this end, the control unit exhibits, for example, a final step for actuating an electric actuator, included in ionizer 112. If the control unit is not integrated in the ionizer and if the ionizer 112 itself exhibits its own electronics, the information may also be transmitted to the electronics of ionizer 112, which decides by itself whether the switching-on condition for production of the ions is met.

The information that is provided for the purpose of assessing the condensate may include, for example, a state of the compressor (on/off), an outside temperature and/or a temperature inside the passenger compartment, because the condensate precipitate may be influenced by the temperature.

Preferably, the control unit 114 assesses the amount of condensate as a function of the outside temperature when the air conditioning system is running in a fresh air mode and as a function of the inside temperature (temperature in the passenger compartment) when the air conditioning system is running in a circulating air mode.

In the control unit 114, the amount of ions may also be pre-determined as a function of various and additional operating parameters. In particular, in the fresh air mode, the ion-loaded air is thinned more than in the circulating air mode. Therefore, the pre-determined amount of ions is, in principle, higher in the fresh air mode than in the circulating air mode. For the sake of protecting the passengers, how much of the ion-loaded air in the air conditioning system is transported into the passenger compartment may be considered. To this end, for example, an opening angle of air flaps between the air conditioning system and the passenger compartment and/or the blower output may be evaluated.

Electronic control unit 114 may evaluate, for example, the input variables, which are necessary for pre-determining the desired value for the amount of ions, by means of a table of values or an algorithm. Electronic control unit 114 may deliver a control variable, corresponding to the desired value, to ionizer 112, for example a high voltage generator, connected to a planar electrode. The air, surrounding the planar electrode, may be ionized (e.g., $O_2 => O_3$) at the planar electrode, to which a high voltage may be applied.

Preferably, the control unit 114 and the ionizer 112 may be designed in such a manner that the ionizer 112 can be heated at least intermittently. This measure may also be carried out, in principle, as an independent improvement of the ionizers, which are actuated and/or regulated by a control unit. The output or rather the production of ions is a function of the amount of condensate on the ionizer 112. Therefore, it may be necessary to heat the ionizer 112 at least intermittently in order to dry at least partially said ionizer prior to its actuation for the production of a pre-determined amount of ions or to prevent the formation of condensate by increasing the temperature of the ionizer 112 above the dew point of the (moist) air. To this end, heating up to about 30 deg. C. has been demonstrated to be sufficient. In order to heat the ionizer 112, said ionizer may be provided, for example, with a simple resistance heating, which can be actuated by control unit 114. If the ionizer 112 is, for example, a planar electrode, to which a high voltage is applied, this planar electrode exhibits an electric heating resistance. The heating may be activated, for example, for about 5 to 10 minutes after every vehicle start or rather engine start. Electronic control unit 114 may receive the necessary switch-on signal via, for example, a databus connected to a control unit, which delivers a "motor is running" signal.

An effective disinfection is achieved in essence with the invention without disturbing the passengers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for disinfecting components of an air conditioning system in a motor vehicle, the device comprising:
    an ionizer arranged in the air conditioning system; and
    an electronic control unit configured to activate the ionizer to produce an amount of ions, wherein the amount of ions is determined by the electronic control unit as a function of an amount of condensate on the components of the air conditioning system to be disinfected, and wherein the electronic unit is further configured to assess the amount of condensate as a function of an outside temperature when the air conditioning system is running in a fresh air mode.

2. The device of claim 1, wherein the amount of condensate is assessed in the electronic control unit based on a plurality of operating parameters provided to said control unit.

3. The device of claim 2, wherein the a plurality of operating parameters provided to the control unit comprises information reflecting at least one of: a state of a compressor, the outside temperature, and a temperature inside a passenger compartment.

4. The device of claim 3, wherein the electronic control unit is further configured to assess the amount of condensate as a function of the temperature inside the passenger compartment when the air conditioning system is running in a circulating air mode.

5. The device of claim 1, wherein the electronic control unit is further configured to assess the amount of condensate as a function of the temperature inside the passenger compartment when the air conditioning system is running in a circulating air mode.

6. The device of claim 1, wherein the electronic control unit is further configured to determine the amount of ions as a function of at least one operating parameter, wherein the at least one operating parameter includes at least one of a circulating air mode, a fresh air mode, an opening angle of a fresh air flap, and a blower output.

7. The device of claim 6, wherein the electronic control unit and the ionizer are configured such that the ionizer is heated at least intermittently.

8. The device of any claim 1, wherein the electronic control unit and the ionizer are configured such that the ionizer is heated at least intermittently.

9. A method for disinfecting components of an air conditioning system in a motor vehicle, the method comprising the acts of:
    determining an amount of ions for disinfecting at least one component of the air conditioning system, based on an amount of condensate on the at least one component, wherein the amount of condensate is assessed as a function of an outside temperature when the air conditioning system is running in a fresh air mode; and
    inducing a production of the determined amount of ions so as to disinfect the at least one component.

10. The method of claim 9, further comprising:
    assessing the amount of condensate based on received information.

11. The method of claim 10, wherein assessing the amount of condensate comprises:
    assessing the amount of condensate by an electronic control unit based on information received by the electronic control unit.

12. The method of claim 10, wherein the received information comprises information reflecting at least one of: a state of a compressor, the outside temperature, and a temperature inside a passenger compartment.

13. The method of claim 12, wherein the amount of condensate is assessed as a function of the temperature inside the passenger compartment when the air conditioning system is running in a circulating air mode.

14. The method of claim 9, wherein the amount of condensate is assessed as a function of the temperature inside the passenger compartment when the air conditioning system is running in a circulating air mode.

15. The method of claim 9, wherein inducing production of the amount of ions comprises activating an ionizer.

16. The method of claim 15, further comprising:
    heating the ionizer at least intermittently.

17. The method of claim 9, wherein determining an amount of ions is further based on at least one operating parameter, wherein the at least one operating parameter includes at least one of a circulating air mode, a fresh air mode, an opening angle of a fresh air flap, and a blower output.

18. The method of claim 17, the method further comprising:

heating at least intermittently an ionizer that produces the amount of ions.

* * * * *